(12) United States Patent
Kattainen et al.

(10) Patent No.: US 10,040,670 B2
(45) Date of Patent: Aug. 7, 2018

(54) ELEVATOR WITH LIGHT CURTAIN FOR MONITORING DOOR

(71) Applicant: KONE CORPORATION, Helsinki (FI)

(72) Inventors: Ari Kattainen, Hyvinkää (FI); Tapio Tyni, Hyvinkää (FI); Jouko Kinnari, Epsoo (FI)

(73) Assignee: KONE CORPORATION, Helsinki (FI)

( * ) Notice: Subject to any disclaimer, the term of this patent is extended or adjusted under 35 U.S.C. 154(b) by 390 days.

(21) Appl. No.: 14/811,431

(22) Filed: Jul. 28, 2015

(65) Prior Publication Data

US 2015/0360912 A1  Dec. 17, 2015

Related U.S. Application Data

(63) Continuation of application No. PCT/FI2014/050181, filed on Mar. 13, 2014.

(30) Foreign Application Priority Data

Mar. 18, 2013 (FI) .................................... 20135260

(51) Int. Cl.
  *B66B 13/14* (2006.01)
  *B66B 13/26* (2006.01)
  *G01V 8/20* (2006.01)

(52) U.S. Cl.
  CPC ............... *B66B 13/26* (2013.01); *G01V 8/20* (2013.01)

(58) Field of Classification Search
  CPC .................................. B66B 13/26; G01V 8/20
  (Continued)

(56) References Cited

U.S. PATENT DOCUMENTS 2,785,772 A    3/1957  Santini
4,029,176 A *  6/1977  Mills ....................... B66B 13/26
                                                                187/317

(Continued)

FOREIGN PATENT DOCUMENTS

CN   202346529 U   7/2012
CN   102849584 A   1/2013

(Continued)

OTHER PUBLICATIONS

International Search Report, issued in PCT/FI2014/050181, dated Jun. 30, 2014.

(Continued)

*Primary Examiner* — Anthony Salata
(74) *Attorney, Agent, or Firm* — Birch, Stewart, Kolasch & Birch, LLP

(57) ABSTRACT

In an elevator, the status information of the receivers, and possibly also of the transmitters, of a light curtain of the elevator is transmitted from the control unit of the light curtain as a response to a query or as messages. The control system of the elevator car is configured to receive the responses or status information and to analyze i) the status information contained therein of at least one receiver the status information contained therein of at least one receiver and of at least one transmitter relating to it, for changing or adjusting the operating mode of the elevator or for giving a control command to the operating system of the elevator.

19 Claims, 3 Drawing Sheets

Figure 1:
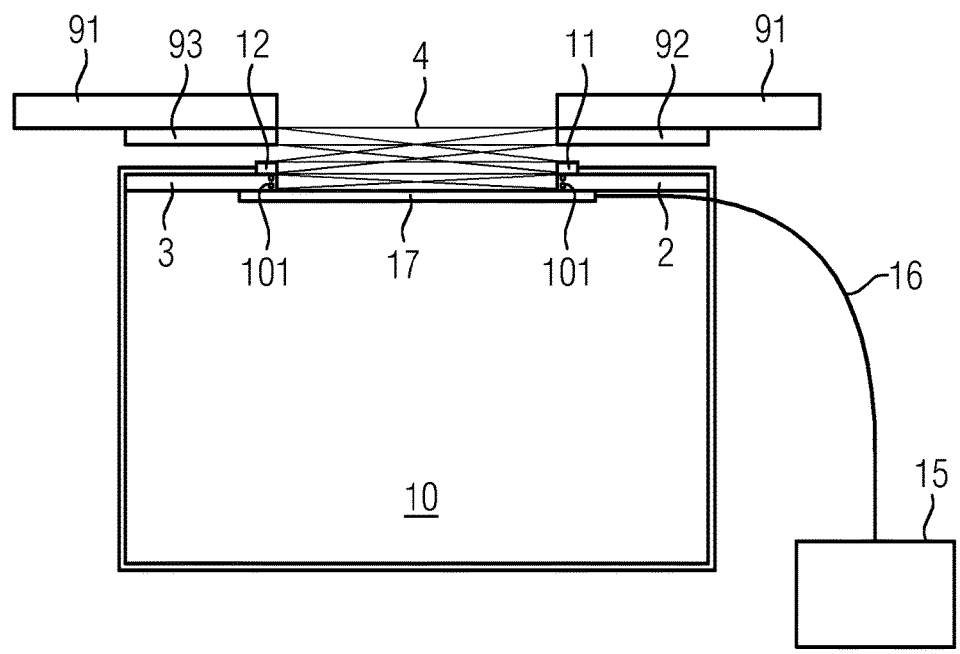

Legend:
2 - right-hand door
3 - left-hand door
4 - opening
10 - elevator car
11 - transmitters
12 - receivers
15 - control system of elevator car
16 - serial bus
17 - door operator of elevator car
91 - wall
92 - right-hand door of landing
93 - left-hand door of landing
101 - means for producing attention signal

(58) Field of Classification Search
USPC .................... 187/247, 316, 317, 391, 393
See application file for complete search history.

(56) References Cited

U.S. PATENT DOCUMENTS

| | | | | |
|---|---|---|---|---|
| 5,142,152 | A * | 8/1992 | Boiucaner | G08B 13/187 |
| | | | | 250/221 |
| 5,518,086 | A * | 5/1996 | Tyni | B66B 13/143 |
| | | | | 187/316 |
| 5,583,334 | A * | 12/1996 | Baumann | G01V 8/20 |
| | | | | 187/316 |
| 5,698,824 | A * | 12/1997 | Platt | B66B 13/26 |
| | | | | 187/317 |
| 5,886,307 | A * | 3/1999 | Full | B66B 13/26 |
| | | | | 187/317 |
| 5,900,598 | A | 5/1999 | Cottle et al. | |
| 6,167,991 | B1 * | 1/2001 | Full | B66B 13/26 |
| | | | | 187/317 |
| 6,247,558 | B1 * | 6/2001 | Bailey | G01V 8/20 |
| | | | | 187/317 |
| 6,547,042 | B1 | 4/2003 | Collins | |
| 7,081,713 | B2 * | 7/2006 | Jurs | F16P 3/144 |
| | | | | 250/221 |
| 7,140,469 | B2 * | 11/2006 | Deplazes | B66B 1/3476 |
| | | | | 187/316 |
| 7,328,662 | B2 * | 2/2008 | Kasai | B61B 1/02 |
| | | | | 104/30 |
| 8,833,524 | B2 * | 9/2014 | De Coi | B66B 13/26 |
| | | | | 187/316 |
| 9,751,727 | B1 * | 9/2017 | Novak | B66B 13/26 |
| 2004/0154873 | A1 | 8/2004 | Curzon et al. | |
| 2009/0236185 | A1 | 9/2009 | Yumura et al. | |
| 2009/0314583 | A1 | 12/2009 | Pustelniak | |
| 2016/0031675 | A1 * | 2/2016 | Silvennoinen | B66B 1/468 |
| | | | | 187/247 |

FOREIGN PATENT DOCUMENTS

| | | |
|---|---|---|
| CN | 202704743 U | 1/2013 |
| GB | 2369185 A | 5/2002 |
| GB | 2395474 A | 5/2004 |
| JP | 10-508818 A | 9/1998 |
| WO | WO 2005/110906 A2 | 11/2005 |

OTHER PUBLICATIONS

Written Opinion of the International Searching Authority, issued in PCT/FI2014/050181, dated Jun. 30, 2014.

* cited by examiner

Legend:
2 - right-hand door
3 - left-hand door
4 - opening
10 - elevator car
11 - transmitters
12 - receivers
15 - control system of elevator car
16 - serial bus
17 - door operator of elevator car
91 - wall
92 - right-hand door of landing
93 - left-hand door of landing
101 - means for producing attention signal

ELEVATOR WITH LIGHT CURTAIN FOR MONITORING DOOR

CROSS REFERENCE TO RELATED APPLICATIONS

This application is a Continuation of PCT International Application No. PCT/FI2014/050181 filed on Mar. 13, 2014, which claims priority under 35 U.S.C. § 119(a) to Patent Application No. 20135260 filed in Finland on Mar. 18, 2013, all of which are hereby expressly incorporated by reference into the present application.

FIELD OF THE INVENTION

The invention relates to the field of elevator technology and more particularly to the control of elevators and to the control of the doors of elevators, and also to light curtains.

TECHNICAL BACKGROUND

A passenger elevator and freight elevator generally comprise one or more moving doors. The moving doors are on the floor levels and in the elevator car.

When a moving door closes, the opening of the door in question decreases in size. For the sake of safety, the aperture must be monitored. A moving door that is closing must be stopped or its movement must be slowed down when a penetration into the opening is detected. In this way it is possible to prevent damage to life, health and property being caused by a moving door.

Section 5.3.6 of the European Standard prEN 81-20:2011-11 "Safety rules for the construction and installation of lifts" defines more precise requirements for how the opening of a moving door must be monitored. The standard in question is based on European Parliament and Council Directive 95/16/EC on the approximation of the laws of the Member States relating to lifts, which describes the requirements to be set for new electrically-operated passenger elevators and freight elevators in the European Economic Area.

A light curtain is generally used to monitor the opening of a moving door. Airdri Limited's patent publications U.S. Pat. No. 6,547,042 (published also EP 1 212 506 B1), GB 2 395 474 A, US 2004/0154873 A1 and WO 2005/110906 A2 present some technical solutions used in light curtains intended for monitoring an opening of a moving door of elevators.

Patent publication WO 2005/110906 A2 presents a way of connecting the control unit of a light curtain using a cable to an operating system for opening and closing a door and also, on the other hand, along a link to the operating system of the elevator roping.

PURPOSE OF THE INVENTION

The purpose of the invention is to diversify the control of an elevator and to enable optimization of the operation of an elevator.

This purpose can be resolved with an elevator according to independent claim 1 and with a light curtain according to independent claim 16. With the method according to claim 17, the control of an elevator can be diversified.

The dependent claims describe preferred embodiments of the invention.

Advantages of the Invention

The elevator comprises a) a light curtain configured to monitor the opening of a moving door of a floor level and/or a moving door of the elevator car, which light curtain comprises a plurality of transmitters and a plurality of receivers as well as a control unit for these, which control unit comprises at least one register for the status information of the transmitters and of the receivers, and b) a control system of the elevator car, said control system being connected via a data transfer connection to the control unit, which control system comprises at least one unit performing digital processing. Examples of units performing digital processing are a processor, a microcontroller, and a field programmable gate array (FPGA).

The control system is configured to send a query over the data transfer connection to the control unit. The control unit is configured to send, in response to the query, over the data transfer connection a response that contains the content of at least one register or information describing the content. The control system is configured to receive the response and to analyze i) the status information contained therein of at least one receiver or ii) the status information contained therein of at least one receiver and of at least one transmitter relating to it, for changing or adjusting the operating mode of the elevator or for giving a control command to the operating system of the elevator.

The light curtain for monitoring a moving door of a floor level and/or a moving door of an elevator car comprises a plurality of transmitters and a plurality of receivers as well as a control unit for these, which control unit comprises at least one register for the status information of the transmitters and of the receivers, and also a data transfer connection. The control unit is configured to send in response, via the data transfer connection, a response to the query received by it over the data transfer connection, which response contains the content of the aforementioned at least one register or information describing the content.

In the light curtains VISION™ VS1 1347 or VS1 1447 fabricated by the department (Formula Systems Technologies House) of Airdri Limited manufacturing light curtains, the light curtain drops the normally-on "door may close" signal for a minimum time after it detects a penetration into the opening of the moving door. The light curtains offered by Airdri Limited do not issue any type of signal that could be used in the control system of an elevator.

Owing to the minimum time of the signal, the light curtains currently on the market are suited only to a limited extent for use in the control system of an elevator, because the signal obtained during the switched-on time from present light curtains only gives information about whether there was an obstacle in the opening at the start of the photoelectric cell delay. On the basis of this information it is difficult or impossible to implement a passenger calculation with sufficient accuracy.

The insight underlying the invention is to adapt a light curtain in such a way that it is provided with a data transfer unit and the control unit of the light curtain is configured to send the status information of at least one receiver, and possibly also the status information of at least one transmitter relating to it, most preferably also during a photoelectric cell delay. At the same time the control system of the elevator is configured to request status information from the control unit of the light curtain and to change or adjust the operating mode of the elevator or to give control commands to the operating system of the elevator. When a conventional on/off signal is involved, it is desired to ensure that the conventional elevator control sees the signal for certain by polling. In the case of serial traffic, it can be conceived that e.g. two messages ensure that the signal gets through.

By means of the elevator and the light curtain it becomes possible to process the status information of least one receiver and possibly also of at least one transmitter relating to it in the control system of the elevator, most preferably also during a photoelectric cell delay or despite a photoelectric cell delay. In this way the control of an elevator can be diversified and optimization of the operation of the elevator can even be enabled. Namely, the control system of the elevator has available for its use information also from other functional systems of the elevator. According to a second aspect, in addition to or instead of this, it is possible to diversify the information to be brought to the control system of the elevator by taking into account in it also the status information of at least one receiver and possibly also of at least one transmitter related to it instead of just the general function signal ("door may close") of the light curtain.

When the control system is configured to monitor the opening of a moving door of a floor level and/or the opening of a moving door of the elevator car i) by using the status information of at least one receiver, or ii) by using the status information of at least one receiver and of at least one transmitter relating to it, and to deduce whether a passenger is entering the elevator car or whether a passenger is leaving the elevator car, the control system is better able to determine the number of passengers in the elevator car. By using the light curtain signal, the method for counting people can be enhanced when both raw data and an estimate of how many interruptions in the light curtain were seen when the doors were open are obtained.

Compared to the "door may close" signal that is available from VISION VS1 1447 or 1347 light curtains, the selection of when weighing or measuring is performed can thus be significantly more detailed. We have observed that a number of passengers can enter the elevator or leave the elevator during the minimum time for the signal of a VS1 1447 or 1347 light curtain. Passengers frequently penetrating the light curtain significantly lengthen the photoelectric cell delay because the photoelectric cell delay starts again after each detected penetration of the opening, thus adding to the imprecision.

When the control system is configured to monitor the disconnection of light rays between at least one transmitter of the light curtain and a receiver relating to said transmitter by comparing in consecutive responses i) the status information contained therein of the receiver or ii) the status information contained therein of the receiver and of a transmitter relating to it, and to deduce from this whether a passenger is entering the elevator car or whether a passenger is leaving the elevator car, the light curtain can be utilized better in calculating the passengers of the elevator.

When a photoelectric cell delay is defined for the light curtain or for the control system, which delay determines the time that must elapse after the freeing of the opening before the elevator gives a command for closing the moving door of the floor level and/or of the elevator car, and when the control system or the control unit is configured to shorten the photoelectric cell delay or to remove it a) when the status information of at least one defined receiver indicates that the receiver in question is covered, and/or b) when the status information of at least one defined receiver indicates that the transmitter relating to the receiver in question is covered, travel with the elevator can be speeded up.

When the control system is configured to give i) on the basis of the status information of at least one receiver or ii) on the basis of the status information of at least one receiver and of at least one transmitter relating to it, a door-open command or a door-close command, opening of the door can be implemented on the basis of information to be received from the light curtain: The control system of the elevator makes a decision about opening the door on the basis of the light curtain information and the door operator opens the door. This is quicker than the normal removing the "door may open" signal and does not cause a photoelectric cell delay. According to a preferred embodiment this can be implemented in such a way that the light curtain is configured to extend to inside the moving door of the elevator car into the elevator car and/or to outside the moving door of the floor level onto the floor level: thus the need to put a hand or foot in front of the moving door to give a "door open" command or is avoided.

According to a preferred embodiment a door-open command is given by moving the hands away from each other in a direction parallel to the receivers of the light curtain and a door-close command is correspondingly given by moving the hands towards each other in a direction parallel to the receivers of the light curtain. For implementing this, the light curtain or the control system is configured to detect a time series from the covered sensors or receivers.

When a photoelectric cell delay is defined for the light curtain or for the control system, which delay determines the time that must elapse after the freeing of the opening before the elevator gives a command for closing the moving door of the floor level and/or the moving door of the elevator car, and when the control system or the control unit is configured to lengthen the photoelectric cell delay a) when the status information of at least one defined receiver indicates that the receiver in question is covered, and/or b) when the status information of at least one defined receiver indicates that the transmitter relating to the receiver in question is covered, a lengthened door-open function can be implemented by means of the light curtain.

When the control system is configured to give i) on the basis of the status information of at least one receiver or ii) on the basis of the status information of at least one receiver and of at least one transmitter relating to it, a lengthened door-open function can be implemented by means of the light curtain. This is implemented most preferably in such a way that a receiver or receivers is/are disposed at a height of 150-180 cm from the floor of the elevator car.

Example: i) a hand is held at a height of 150-180 cm without the rays of the light curtain that are at another height being disconnected; ii) the elevator control system gives feedback (a sound, a haptic or optical signal—e.g. a lamp or light source of the light curtain is flashed) and a lengthened time is switched on; iii) the mode can be exited with a car command (e.g. a button).

Implementation of the lengthened door-open function by means of a light curtain facilitates use of the elevator e.g. while transporting a load when it is not necessary to release a hand for pressing an operating button of the elevator or it is not necessary to move to the point of an operating button of the elevator.

When an area for a departure direction arrow is defined in the light curtain of a moving door, or areas for both the up and down departure direction arrow, and when the control system and/or the control unit is configured to give to the elevator an up-command or down-command in response to an observation made in an area in the light curtain, either one or both of the up- or down-commands can be given by using the light curtain. In this way it is not needed to install separate arrows on each floor level. In addition, this reduces the need for cleaning possible operating buttons of the elevator and helps users of the elevator to avoid disease contagions spreading via the operating buttons. In addition, use of the elevator e.g. when transporting a load becomes easier when it is not necessary to release a hand for pressing an operating button of the elevator or it is not necessary to move to the point of an operating button of the elevator.

When at least one means for producing an attention signal is integrated into the front edge of a moving door of an elevator car, or into the light curtain in said edge, to indicate closing of the moving door and wherein the control system and/or the control unit is configured to activate the aforementioned at least one means for producing an attention signal when closing the moving door, or when the control system has detected a need to close the moving door, the safety of the elevator can be improved when elevator passengers see that the door is closing or that the control system has detected a need to close the moving door. In addition, the operation of the elevator can be optimized because when elevator passengers see that the elevator has a need to close a moving door, and when they further also understand not to go into the detection zone of the light curtain, the elevator car can be made to start more quickly. Optical or acoustic feedback (e.g. by flashing a lamp or light source) can also be given about activation of a prolonged door time.

When at least one means for producing a warning signal is integrated into the front edge of a moving door of an elevator car, or into the light curtain in said edge, to indicate closing of the moving door and wherein the control system and/or the control unit is configured to activate the aforementioned at least one means for producing a warning signal when the elevator closes the moving door despite an obstacle in the opening, the safety of the elevator can be improved.

According to a preferred aspect the response contains the digital status information of at least one receiver. A response can contain the digital status information of a number of receivers and/or transmitters. Digital status information can contain a number of bits, in which case it is possible to receive status information that is more detailed than the detected/not detected or on/off type. Thus more precise information can be give to the control system of the elevator for it to use, and it can make more accurate decisions.

According to a preferred aspect the data transfer connection is a serial data transfer channel, more particularly an RS-485 bus, an RS-232 bus or a CAN bus.

LIST OF FIGURES

Figure 2:
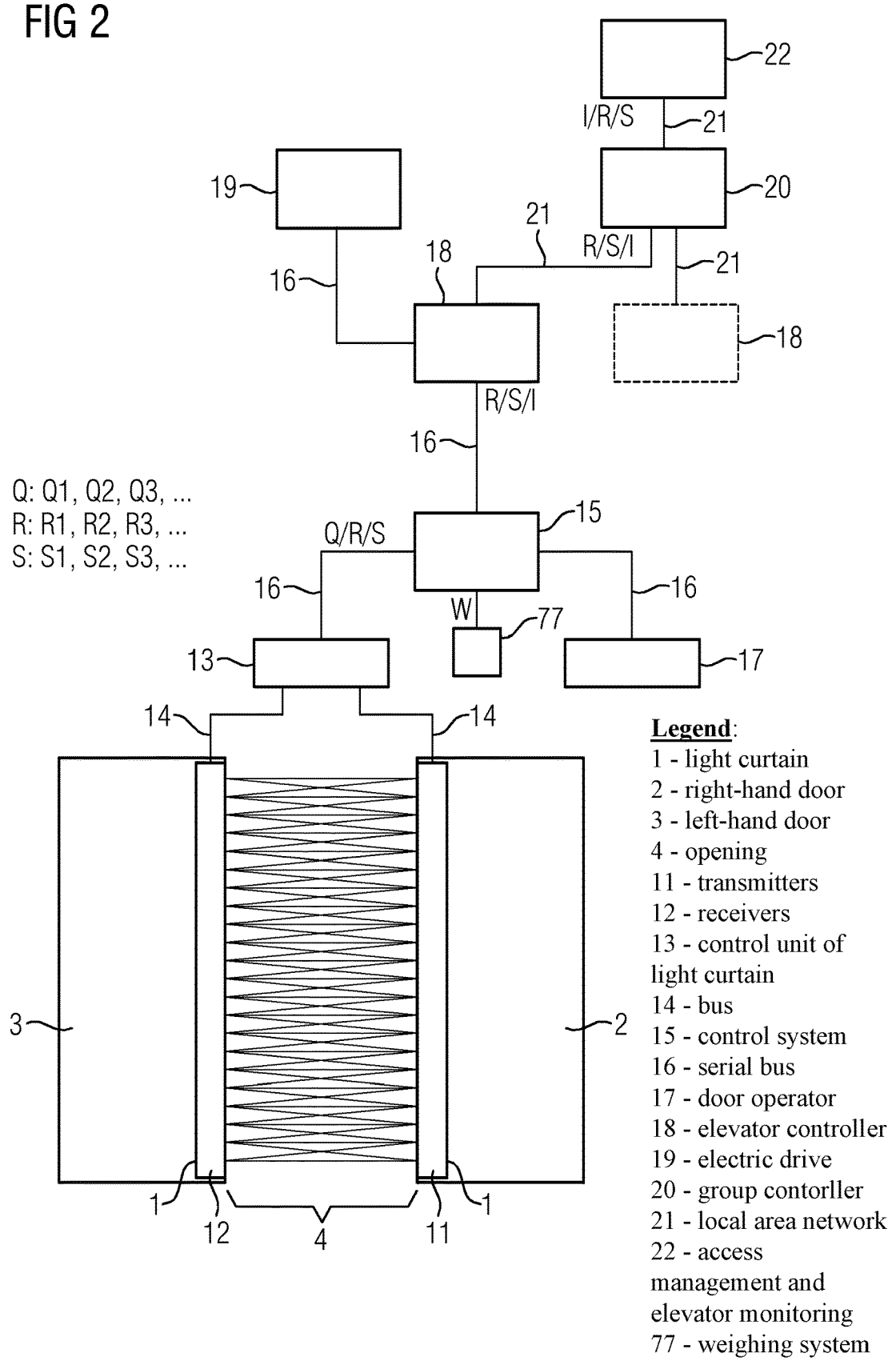
Figure 3:
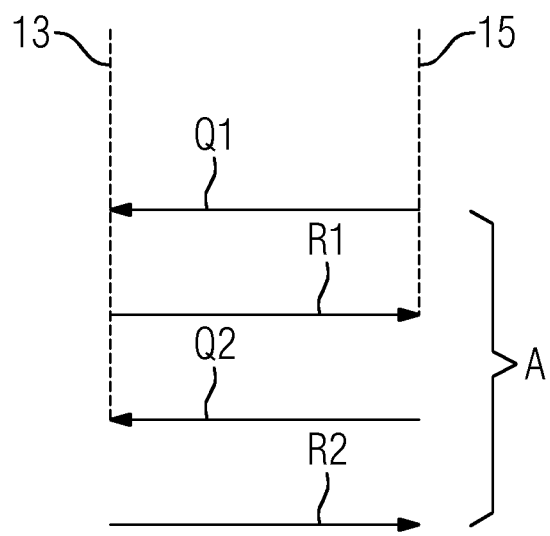
Figure 3:
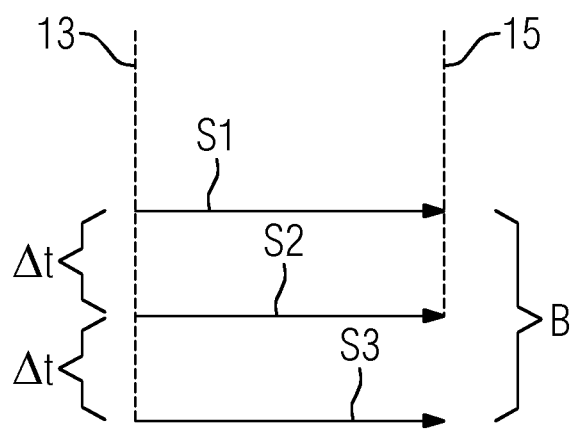

In the following the elevator and the light curtain will be presented in more detail by the aid of the embodiments in the drawings FIGS. 1-3 below. Of the drawings:

FIG. 1 is a simplified and diagrammatic view of a door arrangement of an elevator;

FIG. 2 describes the functional parts of an elevator system;

FIG. 3 describes the signaling according to the invention.

The same reference numbers refer to the same parts in all the FIGs.

DETAILED DESCRIPTION

FIG. 1 is a simplified and diagrammatic view of a door arrangement of an elevator. The right-hand door 92 (directions as viewed from the elevator car 10) of the floor level, the left-hand door 93 of the floor level and the right-hand door 2, left-hand door 3 of the elevator car 10 determine the opening 4 marked in the drawing FIG. 1 with a dashed line.

The light curtain 1 comprises a plurality of transmitters 11 and a plurality of receivers 12. The number of transmitters and receivers can vary. The light curtain 1 is configured to monitor whether the opening 4 has been penetrated. When the opening 4 has been penetrated, the light curtain 1 is configured to prevent the closing of the doors 92, 93, 2, 3 of the opening.

The light curtain 1 is preferably implemented by using the transmission and detection of electromagnetic radiation (typically the electromagnetic radiation is in the visible light or infrared range).

The light curtain 1 comprises at least one a control unit 13, which comprises at least one register for the status information of the transmitters 11 and of the receivers 12. The status information can be collected as single bit data or multiple bit data. Single bit data means that recorded in the register is whether an individual transmitter 11 or receiver 12 is on or off. Multiple bit data means e.g. that the power of a transmitter 11 can be notified or measured or the strength of a signal measured by a receiver 12 can be measured.

The control system 15 of the elevator car 10 comprises at least one unit performing digital processing. The control system 15 is connected to the control unit 13 via a data transfer connection 16. The data transfer connection 16 is most preferably an RS-485 bus, an RS-232 bus or a CAN bus, but it can be implemented by using any suitable bidirectional data transfer connection whatsoever. The data transfer connection (bus) 16 is preferably a serial interface bus, because this simplifies the wiring.

The control system 15 is configured to send a query Q1 (see FIG. 3) over the data transfer connection 16 to the control unit 13.

The control unit 13 is configured to send, in response to the query Q1, over the data transfer connection 16 a response R1 that contains the content of the aforementioned at least one register or information describing the content.

The control system can, after the previous query Q1, send the next query Q2 and after this a selected number of queries. The control unit 13 gives to each respective query Q1, Q2, . . . a response R1, R2, . . . .

The control system 15 is configured to receive each respective response R1, R2, . . . and to analyze i) the status information contained therein of at least one receiver 12 or ii) the status information contained therein of at least one receiver 12 and of at least one transmitter 11 relating to it, for changing or adjusting the operating mode of the elevator or for giving a control command to the operating system 18 of the elevator.

According to a preferred aspect, the responses R1, R2, . . . contain the digital status information of at least one receiver 12. An individual response R1, R2, . . . can contain the digital status information of a number of receivers 11 and/or transmitters 12. The digital status information contains one bit or multiple bits.

According to one aspect the control system 15 is configured to monitor the opening 4 i) by using the status information of at least one receiver 12, or ii) by using the status information of at least one receiver 12 and of at least one transmitter 11 relating to it, and to deduce whether a passenger is entering the elevator car 10 or whether a passenger is leaving the elevator car 10.

According to one aspect the control system 15 is configured to monitor the interruption of light rays between at least one transmitter 11 of the light curtain 1 and a receiver 12 relating to said receiver by comparing in consecutive responses R1, R2 . . . i) the status information contained therein of the receiver or ii) the status information contained therein of the receiver 12 and of a transmitter 11 relating to it, and to deduce from this whether a passenger is entering the elevator car 10 or whether a passenger is leaving the elevator car 10.

A photoelectric cell delay can be defined for the light curtain 1 or for the control system 15, which delay determines the time that must elapse after the freeing of the opening before the elevator gives a command for closing the moving door 92, 93 of the floor level and/or the moving door 2, 3 of the elevator car 10.

The control system 15 or the control unit 13 can be configured to shorten the photoelectric cell delay or to remove it:
  when the status information of at least one defined receiver 12 indicates that the receiver 12 in question is covered; and/or
  when the status information of at least one defined receiver 12 indicates that the transmitter 11 relating to the receiver 12 in question is covered.

The control system 15 can be configured to give i) on the basis of the status information of at least one receiver 12 or ii) on the basis of the status information of at least one receiver 12 and of at least one transmitter 11 relating to it, a door-open command or a door-close command.

The light curtain 1 is preferably configured in such a way that the opening 4 to be monitored extends to inside the moving door 2, 3 of the elevator car into the elevator car 10 and/or to outside the moving door 92, 93 of the floor level onto the landing floor.

A photoelectric cell delay can be defined for the light curtain 1 or for the control system 15, which delay determines the time that must elapse after the freeing of the opening 4 before the elevator gives a command for closing the moving door 92, 93 of the floor level and/or the moving door 2, 3 of the elevator car 10. The control system 15 or the control unit 13 is in this case configured to lengthen the photoelectric cell delay:
  when the status information of at least one defined receiver 12 indicates that the receiver 12 in question is covered; and/or
  when the status information of at least one defined receiver 12 indicates that the transmitter 11 relating to the receiver 12 in question is covered.

The control system 15 can be configured to give on the basis of the status information of at least one receiver 12 or ii) on the basis of the status information of at least one receiver 12 and of at least one transmitter 11 relating to it, a door-open-for-longer command.

An area for a departure direction arrow can be defined in the light curtain 1 of a moving door 2, 3, or areas for both the up and down departure direction arrow, and wherein the control system 15 and/or the control unit 13 is configured to give to the elevator an up-command or down-command in response to an observation made in the area in the light curtain 1. This means that a manually-operated user interface is implemented by means of the light curtain 1, by means of which interface a passenger can give an elevator call.

At least one means 101, e.g. a lamp, light source or loudspeaker, for producing an attention signal can be integrated into the front edge of a moving door 2, 3 of an elevator car 10, or into the light curtain 1 in said edge, to indicate closing of the moving door 2, 3. The control system 15 and/or the control unit 13 can in this case be configured to activate the aforementioned at least one means 101 for producing an attention signal when closing the moving door 2, 3, 92, 93, or when the control system 15 has detected a need to close the moving door 2, 3, 92, 93. Alternatively the means 101 for producing an attention signal can be in the frame of the door 2, 3 of the elevator car 10.

At least one means 101 for producing a warning signal is integrated into the front edge of a moving door 2, 3 of an elevator car 10, or into the light curtain 1 in said edge, to indicate closing of the moving door 2, 3 and wherein the control system 15 and/or the control unit 13 is configured to activate the aforementioned at least one means 101 for producing a warning signal when the elevator closes the moving door 2, 3 despite an obstacle in the opening 4.

According to the invention with a configured light curtain 1 and with a control system 15 a new method to give a door-open command or a door-close command in an elevator can be implemented. When on the basis of responses R (R1, R2, . . . ) to be received to queries Q (Q1, Q2, . . . ) it is detected on the basis of a time series of status information of receivers 12 of a light curtain 1 of an elevator that an elevator passenger moves his/her hands away from each other or moves his/her hands towards each other in a direction parallel to the receivers 12 of the light curtain 1 (see FIG. 2: towards each other=towards each other in the up-down direction; away from each other=away from each other in the up-down direction) and a door-open command or a door-close command is given to the door operator 17 of the elevator car in response to the detection. Monitoring is preferably implemented in the light curtain 1 of the elevator or in the control system 15.

The control system 15 of the elevator car is most preferably connected to a weighing system 77 (e.g. an inductive distance detector or a dynamometer). The weighing system 77 determines the load of the elevator car 10 continuously or at regular intervals and produces weight data W for the use of the control system 15 of the elevator car.

The passenger calculation of the elevator, which calculation can be implemented by means of the control system 15 of the elevator car, the elevator controller 18 or the group controller 20, can be enhanced by adding to the weight data W the passenger calculation data calculated on the basis of the responses R1, R2, . . . .

If the passenger calculation is implemented with an elevator controller 18, the control system 15 of the elevator car can be programmed to forward the responses R1, R2 . . . . or the data I defined on the basis of them to the elevator controller 18.

If the passenger calculation is implemented with the group controller 20, the control system 15 of the elevator car can be programmed to send the responses R1, R2 . . . or the data I defined on the basis of them to the group controller 20 or to the elevator controller 18, which forwards the data I to the group controller 20.

The data for the passenger calculation is collected most preferably from knee height (approx. 30-60 cm) from one individual transmitter-receiver pair of the light curtain 1. In this case the responses R1, R2 . . . can comprise e.g. the signal strength of only the respective individual receiver 12 or the logical data e.g. of whether the strength of the signal received by the receiver 12 in question exceeds a predefined threshold value. The enhanced passenger calculation data that is compared to weight measurements and collected in the manner described above can be used for adjusting or optimizing the group control of the elevator. This is implemented e.g. in such a way that the group controller 20 forms statistics from the passenger calculation data and instructs the elevator controllers 18 belonging to the system for adjusting or optimizing the traffic flows. FIG. 2 presents an elevator system that comprises two elevators, each having its own elevator controller 18. It is, however, possible that a group controller 20 controls many (N=2, 3, 4, . . . ) elevator controllers. That is the case particularly in large buildings. In this case by enhancing the adjustment or optimization of traffic flows by means of the enhanced passenger calculation data I that is compared to weight measurements W, the operation of the whole system can be optimized to better correspond to the need of a passenger flow.

The enhanced passenger calculation data I compared to weight measurements can be used also for producing data, or statistics therefrom, for the access management and elevator monitoring 22 of the building automation. By means of the enhanced passenger calculation data I, a better estimate can be made of how many people are going where. In this way the adjustment of e.g. heating, air-conditioning and lighting can be implemented more precisely. When e.g. traffic flows in department stores are known more precisely, the passenger calculation data I being received can be used for adapting the display of goods.

Embodiment 1

Power-Saving Mode

The normal operating mode of a light curtain 1 when using the elevator is to put the light curtain 1 into power-saving mode between consecutive openings of the doors.

Basic operating sequence (suited for use when the light curtain 1 is in power-saving mode):
1. The elevator controller 18 or the control system 15 of the elevator car sends a command to the light curtain 1 to switch to operating mode.
2. The light curtain 1 responds to the mode-switch command and switches to operating mode.
3. The control system 15 of the elevator car queries the status information from the light curtain until the light curtain 1 responds that it is in operating mode. The light curtain 1 responds to each status information query.
4. The control system 15 of the elevator car starts to open the door.
5. The control system 15 of the elevator car sends a query (Q1) to the light curtain 1. The light curtain 1 responds to the control system 15 of the elevator car with the response message R1.
6. Step 5 is repeated until the door is open (Q2, R2; Q3, R3, . . . ).
7. The control system 15 of the elevator car has closed the door 2, 3.
8. The control system 15 of the elevator car sends a command to the light curtain 1 to switch to power-saving mode (standby).
9. The light curtain 1 responds to the mode-switch message and starts to switch to power-saving mode.

Embodiment 2

Electricity-Saving Functions for Saving Energy and Prolonging the Service Life of the Light Curtain 1

When the door 2, 3 is closed: power-off command
When the door 2, 3 opens: the light curtain 1 is used just as a photoelectric cell for calculating traffic
When the door 2, 3 is open: many, e.g. all, rays of the light curtain 1 are monitored. For example, a longer-time command is possible.

When the door 2, 3 closes: the exchange (query Q-response R) or sending (status message S) of messages is speeded up and all the rays of the light curtain 1 operate.

The invention must not be regarded as being limited only to the claims below but instead should be understood to include all legal equivalents of said claims and combinations of the embodiments presented.

As an alternative to the control system 15 of the elevator car sending a query Q1 (queries Q1, Q2, . . . ) to the control unit 13 of the light curtain 1, the control unit 13 can be configured to continuously send messages S (S1, S2, S3, . . . ) without waiting for a query Q. Status messages can be sent at regular intervals, e.g. at 50 ms intervals.

LIST OF REFERENCE NUMBERS USED

1 light curtain
2 right-hand door of elevator car
3 left-hand door of elevator car
4 opening being monitored
11 transmitters
12 receivers
13 control unit of light curtain
14 bus
15 control system of elevator car
16 serial bus
17 door operator of elevator car
18 elevator controller
19 electric drive
20 group controller
21 local area network
22 access management and elevator monitoring of building automation
77 weighing system
91 wall
92 right-hand door of landing
93 left-hand door of landing
101 means for producing an attention signal (e.g. a lamp, light source or loudspeaker)

The invention claimed is:
1. An elevator, comprising:
a light curtain configured to monitor the opening of a moving door of a floor level and/or a moving door of the elevator car, said light curtain comprising a plurality of transmitters and a plurality of receivers as well as a control unit, said control unit comprising at least one register for the status information of the transmitters and of the receivers; and
a control system of the elevator car, said control system being connected via a data transfer connection to the control unit, said control system comprising at least one unit performing digital processing,
wherein the control unit is configured to detect, on the basis of a time series of status information of the receivers, when an elevator passenger moves his/her hands away from each other or moves his/her hands towards each other in a direction parallel to the receivers, and
wherein:
A)
the control system is configured to send a query over the data transfer connection to the control unit;
the control unit is configured to send, in response to the query, over the data transfer connection a response that contains the content of the aforementioned at least one register or information describing the content; and the control system is configured to receive the response and to analyze i) the status information contained therein of at least one receiver or ii) the status information contained therein of at least one receiver and of at least one transmitter relating to the at least one receiver, for changing or adjusting the operating mode of the elevator or for giving a control command to the operating system of the elevator, and/or

B)

the control unit is configured to send over the data transfer connection status information that contains the content of the at least one register or information describing the content; and the control system is configured to receive the status information and to analyze i) the status information contained therein of at least one receiver or ii) the status information contained therein of at least one receiver and of at least one transmitter relating to the at least one receiver, for changing or adjusting the operating mode of the elevator or for giving a control command to the operating system of the elevator.

2. The elevator according to claim 1, wherein the control system is configured to monitor the opening of a moving door of a floor level and/or the opening of a moving door of the elevator car i) by using the status information of the plurality of receivers, or ii) by using the status information of the plurality of receivers and the plurality of transmitters relating to the plurality of receivers, and to deduce whether a passenger is entering the elevator car or whether a passenger is leaving the elevator car.

3. The elevator according to claim 1, wherein the control system is configured to monitor the interruption of light rays between the plurality of transmitters of the light curtain and the plurality of receivers relating to the plurality of transmitters by comparing in consecutive responses i) the status information contained therein of the receivers or ii) the status information contained therein of the receivers and of transmitters relating to the receivers and to deduce from this whether a passenger is entering the elevator car or whether a passenger is leaving the elevator car.

4. The elevator according to claim 1, wherein:
a photoelectric cell delay is defined for the light curtain or for the control system, which delay determines the time that must elapse after the freeing of the opening before the elevator gives a command for closing the moving door of the floor level and/or the moving door of the elevator car; and
wherein the control system or the control unit is configured to shorten the photoelectric cell delay or to remove the photoelectric cell delay:
when the status information of at least one defined receiver indicates that the receiver in question is covered; and/or
when the status information of at least one defined receiver indicates that the transmitter relating to the receiver in question is covered.

5. The elevator according to claim 1, wherein: the control system is configured to give i) on the basis of the status information of at least one receiver or ii) on the basis of the status information of at least one receiver and of at least one transmitter relating to the at least one receiver, a door-open command or a door-close command.

6. The elevator according to claim 5, wherein the light curtain is configured to extend to inside the moving door of the elevator car into the elevator car and/or to outside the moving door of the floor level onto the landing floor.

7. The elevator according to claim 1, wherein:
a photoelectric cell delay is defined for the light curtain or for the control system, which delay determines the time that must elapse after the freeing of the opening before the elevator gives a command for closing the moving door of the floor level and/or the moving door of the elevator car; and
wherein the control system or the control unit is configured to lengthen the photoelectric cell delay:
when the status information of at least one defined receiver indicates that the receiver in question is covered; and/or
when the status information of at least one defined receiver indicates that the transmitter relating to the receiver in question is covered.

8. The elevator according to claim 1, wherein: the control system is configured to give on the basis of the status information of at least one receiver or ii) on the basis of the status information of at least one receiver and of at least one transmitter relating to the at least one receiver, a door-open-for-longer command.

9. The elevator according to claim 1, wherein an area for a departure direction arrow, or areas for both the up and down departure direction arrow, are defined in the light curtain of a moving door of said elevator, and wherein the control system and/or the control unit is configured to give to the elevator an up-command or down-command in response to an observation made in the area in the light curtain.

10. The elevator according to claim 1, wherein at least one means for producing an attention signal to indicate closing of the moving door is integrated into the front edge of a moving door of an elevator car of which elevator, or into the light curtain in said edge, and wherein the control system and/or the control unit is configured to activate the at least one means for producing an attention signal when closing the moving door, or when the control system has detected a need to close the moving door.

11. The elevator according to claim 1, wherein at least one means for producing a warning signal to indicate closing of the moving door is integrated into the front edge of a moving door of an elevator car of which elevator, or into the light curtain in said edge, and wherein the control system and/or the control unit is configured to activate the at least one means for producing a warning signal when the elevator closes the moving door despite an obstacle in the opening.

12. The elevator according to claim 1, wherein the response or the status information contains the digital status information of at least one receiver.

13. The elevator according to claim 12, wherein the digital status information contains multiple bits.

14. The elevator according to claim 12, wherein a response contains the digital status information of a number of receivers and/or transmitters.

15. The elevator according to claim 1, wherein the data transfer connection is a serial data transfer channel, more particularly an RS-485 bus, an RS-232 bus or a CAN bus.

16. A light curtain for monitoring the opening of a moving door of a floor level and/or a moving door of the elevator car, comprising a plurality of transmitters and a plurality of receivers as well as a control unit, said control unit comprising at least one register for the status information of the transmitters and of the receivers, as well as a data transfer connection, wherein the control unit is configured to detect, on the basis of a time series of status information of the receivers, when an elevator passenger moves his/her hands away from each other or moves his/her hands towards each other in a direction parallel to the receivers, and wherein:

A)
the control unit is configured to send, in response to a query received by the control unit via the data transfer connection, over the data transfer connection a response that contains the content of the at least one register or information describing the content, and/or B)
the control unit is configured to send over the data transfer connection status information that contains the content of the at least one register or information describing the content.

17. The method according to claim 16, wherein the method is implemented in a light curtain of an elevator or in an elevator control system.

18. The elevator according to claim 2, wherein the control system is configured to monitor the interruption of light rays between the plurality of transmitters of the light curtain and the plurality of receivers relating to the plurality of transmitters by comparing in consecutive responses i) the status information contained therein of the receivers or ii) the status information contained therein of the receivers and of the transmitters relating to the receivers and to deduce from this whether a passenger is entering the elevator car or whether a passenger is leaving the elevator car.

19. The elevator according to claim 2, wherein:

a photoelectric cell delay is defined for the light curtain or for the control system, which delay determines the time that must elapse after the freeing of the opening before the elevator gives a command for closing the moving door of the floor level and/or the moving door of the elevator car; and wherein the control system or the control unit is configured to shorten the photoelectric cell delay or to remove the photoelectric cell delay:

when the status information of at least one defined receiver indicates that the receiver in question is covered; and/or when the status information of at least one defined receiver indicates that the transmitter relating to the receiver in question is covered.

* * * * *